(12) United States Patent
Lee et al.

(10) Patent No.: US 11,875,395 B2
(45) Date of Patent: Jan. 16, 2024

(54) ITEM SALES INFORMATION PROCESSING METHOD AND ELECTRONIC DEVICE

(71) Applicant: Coupang Corp., Seoul (KR)

(72) Inventors: Kyu Yong Lee, Seoul (KR); Seung Hwan Lee, Seoul (KR); Catherine Chang, Seoul (KR); Min Ji Yoon, Seoul (KR)

(73) Assignee: Coupang Corp., Seoul (KR)

( * ) Notice: Subject to any disclaimer, the term of this patent is extended or adjusted under 35 U.S.C. 154(b) by 123 days.

(21) Appl. No.: 17/239,357

(22) Filed: Apr. 23, 2021

(65) Prior Publication Data
US 2022/0318885 A1 Oct. 6, 2022

(30) Foreign Application Priority Data
Mar. 30, 2021 (KR) .......................... 10-2021-0041128

(51) Int. Cl.
*G06Q 30/00* (2023.01)
*G06Q 30/0601* (2023.01)
*G06Q 10/087* (2023.01)

(52) U.S. Cl.
CPC ....... *G06Q 30/0637* (2013.01); *G06Q 10/087* (2013.01); *G06Q 30/0641* (2013.01)

(58) Field of Classification Search
CPC .................................................... G06Q 30/00
See application file for complete search history.

(56) References Cited

U.S. PATENT DOCUMENTS

| 7,783,379 | B2 * | 8/2010 | Beane ............. G06Q 20/40145 700/244 |
| 10,402,804 | B1 * | 9/2019 | Wittern, III et al. ... G07F 1/122 |
| 10,949,901 | B2 * | 3/2021 | Frost .................. G06Q 20/4014 |
| 11,430,031 | B1 * | 8/2022 | Stump ................ G06Q 30/0607 |
| 2015/0186886 | A1 * | 7/2015 | Schwalb ............. G06Q 20/405 705/44 |

(Continued)

FOREIGN PATENT DOCUMENTS

| KR | 1020010078450 A | 8/2001 |
| KR | 1020020007716 A | 1/2002 |

(Continued)

OTHER PUBLICATIONS

Quantity Restricting1, Robinson, Travis, "How Pharmacies limit sudafed sales" knopnews2.com, dated Feb. 25, 2016. (Year: 2016)*

(Continued)

*Primary Examiner* — Mark A Fadok
(74) *Attorney, Agent, or Firm* — Banner & Witcoff, Ltd.

(57) ABSTRACT

According to various example embodiments, an information processing method of an electronic device may include acquiring information on a selection of a user for one or more items, confirming whether at least some of the one or more selected items are included in a specific category, confirming limited quantity information corresponding to the specific category based on a confirmation result, confirming purchase request quantity information based on the information on the selection of the user for the one or more items, confirming information of the user, and providing purchasable quantity information related to the one or more items to the user based on the limited quantity information and the information of the user.

17 Claims, 7 Drawing Sheets

(56) References Cited

U.S. PATENT DOCUMENTS

2018/0187954 A1 7/2018 Yang et al.

FOREIGN PATENT DOCUMENTS

| KR | 1020020009262 A | 2/2002 |
|---|---|---|
| KR | 1020060085882 A | 7/2006 |
| KR | 1020060108577 A | 10/2006 |
| KR | 100887424 B1 | 3/2009 |
| KR | 1020130031436 A | 3/2013 |
| KR | 101569864 B1 | 11/2015 |
| KR | 101648933 B1 | 8/2016 |
| KR | 1020170004096 A | 1/2017 |
| KR | 1020180080068 A | 7/2018 |

OTHER PUBLICATIONS

Quantity Restricting2, "mLegal requirements for the sale and purchase of drug products containing pseudoephedrine, ephedrine, and phenylpropanolamine", FDA.gov, dated Nov. 24, 2017. (Year: 2017).*
Apr. 12, 2023 (KR) Notice of Preliminary Rejection Appn 10-2021-0157608.

* cited by examiner

| | |
|---|---|
| ⟨ Quantity per piece × quantity selection | |
| 50 pieces × 1box | |
| 21,460 won (429 won per piece) □ | ~410 |
| Guarantee to arrive tomorrow (Wed) 2/24 | |
| 50 pieces × 2boxes | |
| 41,670 won (417 won per piece) □ | |
| Guarantee to arrive tomorrow (Wed) 2/24 | |
| 50 pieces × 3boxes | |
| 70,500 won (470 won per piece) □ | 420 |
| Guarantee to arrive the day after tomorrow (Thu) 2/25 | |
| 50 pieces × 4boxes | |
| 92,500 won (463 won per piece) □ | |
| Guarantee to arrive the day after tomorrow (Thu) 2/25 Nearly sold out (8 left) | |
| 50 pieces × 5boxes | |
| 117,500 won (470 won per piece) □ | |
| Guarantee to arrive the day after tomorrow (Thu) 2/25 | |
| 50 pieces × 10boxes | |
| 225,000 won (450 won per piece) □ | |
| Guarantee to arrive the day after tomorrow (Thu) 2/25 | |

ITEM SALES INFORMATION PROCESSING METHOD AND ELECTRONIC DEVICE

BACKGROUND

Technical Field

Example embodiments of the present disclosure relate to item sales information processing method and electronic device.

Description of the Related Art

Items sold through e-commerce are diversifying due to activation of a non-contact market. Users may conveniently purchase and receive an item that they intend to purchase through a click and payment.

A sales quantity of some of the various items on sale may be limited. For example, since items with a surge in demand may not be supplied smoothly, a sales quantity of these items may be limited in advance. When users receive information on the limitation of the purchase quantity, they may purchase items more conveniently.

As the related document that may be referenced, there is Korean Patent Laid-Open Publication No. 2002-0009262. The related document discloses features of providing users with reasons for restriction while restricting a sale of items in e-commerce but does not disclose providing information on a purchasable quantity according to a purchase time for each user account for items with limited sales quantity. Therefore, a method and apparatus for solving such a problem may be required.

SUMMARY

Technical Goals

A purchase quantity of some of items that a user intends to purchase may be limited. When a user intends to purchase items with a limited purchase quantity, the purchase process may be inconvenient when the user does not know the information on the purchasable quantity of items.

An aspect provides a method and apparatus for processing information related to a quantity of an item that a user may purchase and a time when a user may purchase an item in the future by using information on a selection of an item with limited purchase quantity, information of the user, and information on a quantity of an item that a user intends to purchase.

Technical Solutions

According to an aspect, there is provided an electronic device for performing an information processing method, the electronic device including a processor, in which the processor is configured to acquire information on a selection of a user for one or more items; confirm whether at least some of the one or more selected items are included in a specific category; confirm limited quantity information corresponding to the specific category based on a confirmation result; confirm purchase request quantity information based on the information on the selection of the user for the one or more items; and provide purchasable quantity information related to the one or more items to a user based on the limited quantity information and information of the user.

According to another aspect, there is also provided a non-transitory computer-readable storage medium including a medium that stores computer-readable instructions to execute a method of processing item sales information, in which when the computer-readable instructions are executed by a processor, the processor performs: acquiring information on a selection of a user for one or more items; confirming whether at least some of the one or more selected items are included in a specific category; confirming limited quantity information corresponding to the specific category based on a confirmation result; confirming purchase request quantity information based on the information on the selection of the user for the one or more items; confirming information of a user; and providing purchasable quantity information related to the one or more items to the user based on the limited quantity information and the information of the user.

Effects

According to example embodiments of the present disclosure, it is possible to provide a method of processing item sales information to efficiently purchase an item by providing purchase quantity information and a purchase time for an item that a user intends to purchase.

According to example embodiments of the present disclosure, it is possible to provide an electronic device to more conveniently provide a purchase environment by confirming whether an item that a user intends to purchase is an item with a purchase limit quantity and providing purchase-related information on or regarding the confirmed item by using information of a user including a purchase history of the user.

DETAILED DESCRIPTION

General terms that are currently widely used are selected as terms used in example embodiments in consideration of functions in the present disclosure but may be changed depending on the intention of those skilled in the art or a judicial precedent, the emergence of a new technique, and the like. In addition, in specific cases, there may be terms arbitrarily chosen by the applicant. In this case, the meaning of such a term will be described in detail in a corresponding description portion. Therefore, the terms used in the present disclosure should be defined on the basis of the meanings of the terms and the content throughout the present disclosure rather than the simple names of the terms.

Throughout the specification, unless otherwise designated, "including" any component means that other components may be further included rather than excluding other components. In addition, the terms "unit," "module," and the like described in the specification refer to a processing unit of at least one function or operation and may be implemented by hardware or software or a combination of hardware and software.

The expression "at least one of a, b, and c" described throughout the specification may include "a alone," "b alone," "c alone," "a and b," "a and c," "b and c," or "all of a, b, and c."

A "terminal" described below may be implemented as a computer or a portable terminal that may access a server or other terminals through a network. Here, computers may include, for example, a notebook computer, a desktop computer, a laptop computer, and the like, which are equipped with a web browser, and portable terminals are wireless communication devices that ensure portability and mobility and may include, for example, all kinds of handheld-based wireless communication devices such as a communication-based terminal, a smartphone, and a tablet personal computer (PC) which support International Mobile Telecommunications (IMT), code division multiple access (CDMA), W-code division multiple access (W-CDMA), Long Term Evolution (LTE), etc.

Hereinafter, the example embodiments of the present disclosure will be described in detail with reference to the accompanying drawings so that those skilled in the art to which the present disclosure pertains may easily practice the present disclosure. However, the present disclosure may be implemented in various different forms and is not limited to the example embodiments described herein.

Hereinafter, the example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without ambiguity by omitting unnecessary descriptions.

For the same reason, some components in the accompanying drawings are exaggerated, omitted, or schematically illustrated. In addition, the size of each component does not entirely reflect the actual size. The same reference numerals are assigned to the same or corresponding components in each drawing.

Various advantages and features of the present disclosure and methods accomplishing them will become apparent from the following description of the example embodiments with reference to the accompanying drawings. However, the present disclosure is not limited to the example embodiments disclosed herein but may be implemented in various forms. The example embodiments make contents of the present disclosure thorough and are provided so that those skilled in the art can easily understand the scope of the present disclosure. Therefore, the present disclosure will be defined by the scope of the appended claims. Throughout the specification, like reference numerals denote like components.

In this case, it will be appreciated that each block of a processing flowchart and combinations of the flowcharts may be executed by computer program instructions. Since these computer program instructions may be installed in a processor of a general computer, a special purpose computer, or other programmable data processing apparatuses, these computer program instructions executed through the processor of the computer or the other programmable data processing apparatuses create a means for performing functions described in the block(s) of the flowchart. Since these computer program instructions may also be stored in a computer usable or computer readable memory of a computer or other programmable data processing apparatuses in order to implement the functions in a specific scheme, the computer program instructions stored in the computer usable or computer readable memory can also produce manufacturing articles including an instruction means for performing the functions described in the block(s) of the flowchart. Since the computer program instructions may also be installed in the computer or the other programmable data processing apparatuses, the instructions perform a series of operation steps on the computer or the other programmable data processing apparatuses to create processes executed by the computer, thereby running the computer, or the other programmable data processing apparatuses may also provide operations for performing the functions described in the block(s) of the flowchart.

In addition, each block may indicate some modules, segments, or codes including one or more executable instructions for executing a specific logical function(s). Further, it is to be noted that functions described in the blocks occur regardless of a sequence in some alternative example embodiments. For example, two blocks that are consecutively shown may in fact be simultaneously performed or performed in a reverse sequence depending on corresponding functions.

Figure 1:
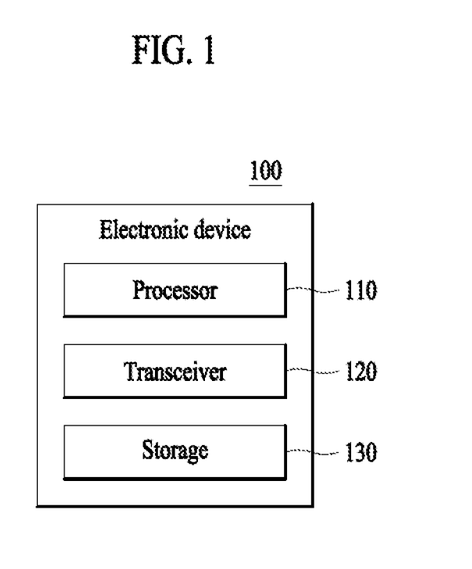
FIG. 1 is a block diagram illustrating components of an electronic device according to various example embodiments of the present disclosure.

FIG. 1 is a block diagram illustrating components of an electronic device according to various example embodiments of the present disclosure.

Referring to FIG. 1, internal components of the electronic device 100 are not limited to the illustrated components. The electronic device 100 may include at least one of a processor 110, a transceiver 120, and a storage 130.

The processor 110 may process a series of operations for performing a method of processing item sales information according to various example embodiments of the present disclosure. The processor 110 may control other components of the electronic device 100.

The transceiver 120 may perform a function of transmitting information stored in the storage 130 of the electronic device 100 or information processed by the processor 110 to other devices or a function of receiving information from other devices to the electronic device 100.

The storage 130 has a data structure implemented in a predetermined storage space of the electronic device 100, and thus, functions such as storing, searching, deleting, editing, or adding data may be freely performed. For example, the storage 130 may include fields or components for processing functions such as storing, searching, deleting, editing, or adding data. The storage 130 may store data related to performing the method of providing information by the electronic device 100. For example, the storage 130 may store instructions or data for an execution operation of the processor 110.

Figure 2:
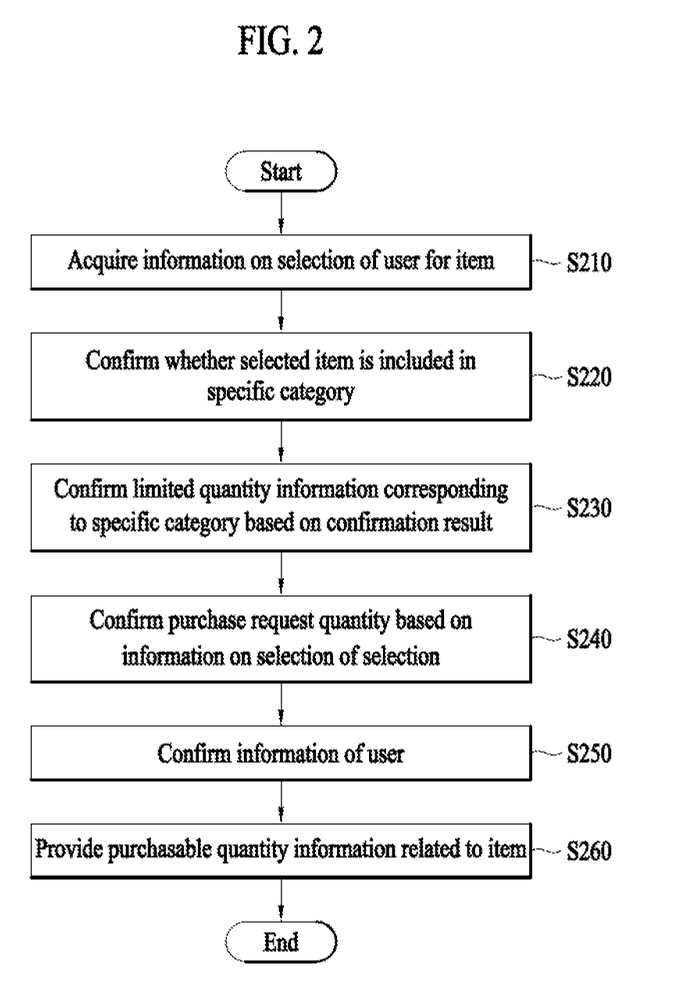
FIG. 2 is a schematic flowchart of a method of processing sales information according to various example embodiments of the present disclosure.

FIG. 2 is a schematic flowchart of a method of processing sales information according to various example embodiments of the present disclosure.

In operation S210, the electronic device may acquire information on a selection of a user for an item. For example, a user may be provided with a page including information on or regarding a plurality of items through a terminal. The electronic device may receive a selection of a user for an item input through a terminal and obtain information on the selection of the user for the item.

In operation S220, the electronic device may confirm whether the item selected by the user is included in a specific category. For example, the specific category may include items with limitations on a purchase quantity. Certain categories may be items related to hygiene products, such as masks and detergents, whose demand is exploding due to an outbreak of infectious diseases, items with increasing demand due to insufficient supply, and items that have a limit on the number of purchases per person due to national or state government policy. The electronic device may receive information on an item included in a specific category from a storage or an external device and may confirm whether the item selected by the user is the item included in the specific category.

In operation S230, the electronic device may confirm limited quantity information on a purchase quantity of the item based on a result of confirming whether the selected item is included in the specific category. For example, when a mask is the item included in the specific category, the electronic device may acquire an input of a user to select the mask and move to a detailed page for purchase. The electronic device may confirm whether the mask, which is the item selected by the user, is included in the specific category and confirm purchase limit quantity information for purchasing the mask. The purchase limit quantity information on the item included in the specific category may change according to policies. For example, the purchase limit quantity of the mask may vary depending on a level of response to an infectious disease.

In operation S240, the electronic device may confirm purchase request quantity information based on the information on the selection of the user. The quantity request quantity information may mean information on a quantity of the selected item which a user intends to purchase. For example, when a user selects a mask and intends to purchase 100 masks, the purchase request quantity information on the mask may correspond to 100 pieces.

In operation S250, the electronic device may confirm the information of the user. For example, criteria for each period may be added to the purchase limit quantity of the item included in the specific category. The purchase limit quantity of the mask may be set to 100 pieces per person within a period of one month. The information of the user may include account information of a user, information on a time when the item included in the specific category has been purchased through an account of the user, and information on the purchase quantity of the item included in the specific category through the account of the user. For example, the electronic device may confirm whether the information on the purchase time of the item included in the specific category through the account of the user is included in a preset period. Here, the range of the preset period may be a period of one month and corresponds to a range of a period related to the purchase limit quantity of the item included in the specific category. The electronic device may confirm first quantity information, which is the purchase quantity information corresponding to the time when the item included in the specific category has been purchased, through the account of the user. For example, the electronic device may confirm the first quantity information that a first user has purchased 10 masks on Feb. 1, 2021, 20 masks on Feb. 10, 2021, and 30 masks on Feb. 20, 2021.

In operation S260, the electronic device may provide purchasable quantity information related to the item included in the specific category. For example, the electronic device may provide purchasable quantity information related to a mask to at least some area of a detailed page for purchasing an item or to at least some area of a page through which a user inputs setting a purchase quantity of an item. The purchasable quantity information related to the item provided through electronic devices may be provided in various pages.

Figure 3:
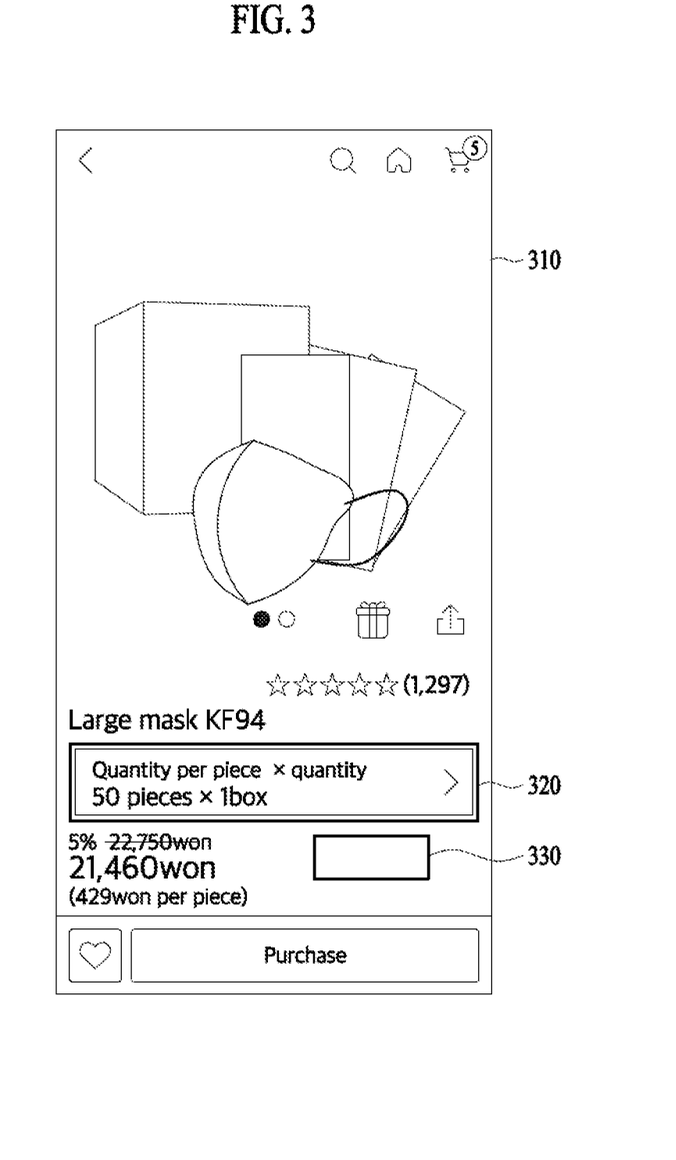
FIG. 3 is an exemplary diagram of a user's selection regarding item selection according to various example embodiments of the present disclosure.

FIG. 3 is an exemplary diagram related to a user's selection regarding item selection according to various example embodiments of the present disclosure.

Referring to FIG. 3, the electronic device may provide a page 310 about an item in response to an input of moving to a detailed page for mask purchase through a user terminal.

The electronic device may confirm when the mask is included in the specific category. The electronic device may confirm limited quantity information corresponding to the specific category based on the confirmation result. For example, the electronic device may confirm purchasable quantity information on a mask that a user intends to purchase. Such purchasable quantity information may be provided to some area 330 near an area to which price information is provided. The some area 330 to which the purchasable quantity information is provided is an example and the purchasable quantity information may be provided to any area.

According to various example embodiments, the electronic device may confirm purchase request quantity information on a mask, which is an item selected by a user. For example, a user may perform an input for selecting a purchase request quantity of a mask, and the user may select a purchase request quantity through an area 320 for selecting a quantity of an item. An example of selecting the purchase request quantity will be described below with reference to FIG. 4.

Figure 4:
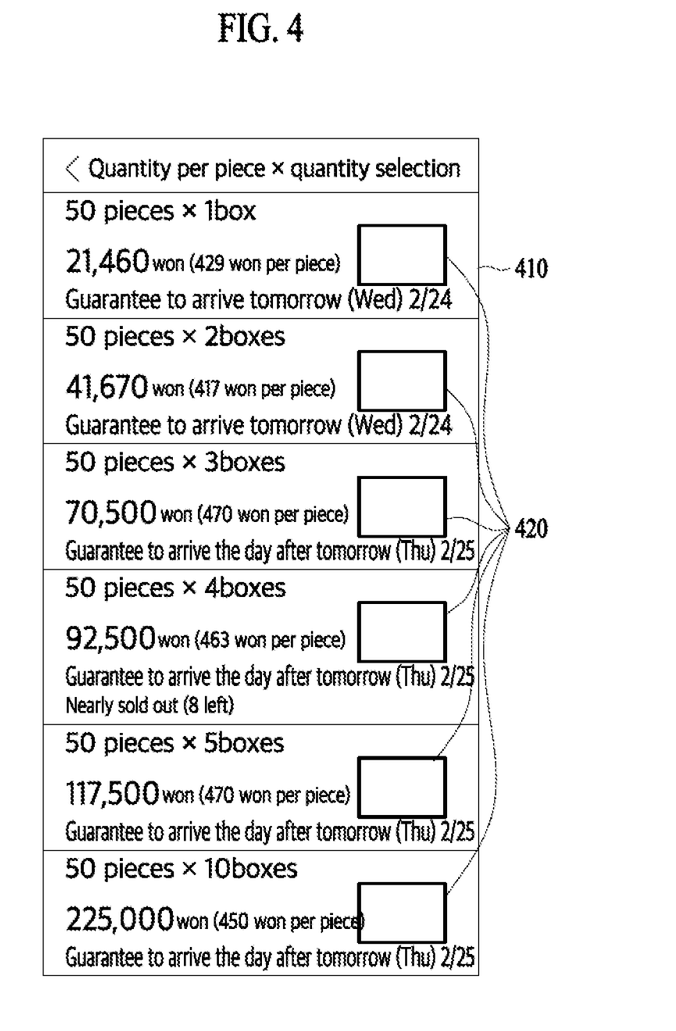
FIG. 4 is an exemplary diagram of a quantity selection of an item according to various example embodiments of the present disclosure.

FIG. 4 is an exemplary diagram of a quantity selection of an item according to various example embodiments of the present disclosure.

Referring to FIG. 4, the electronic device may provide an option for selecting a purchase request quantity of a user. The example illustrated in FIG. 4 may be the example related to the purchase request quantity of the mask of FIG. 3, and an example of the purchase request quantity of another item may be different from the example related to the purchase request quantity of the mask of FIG. 3. For example, when powdered milk is included in a specific category, an example related to a purchase request quantity of the powdered milk may be provided in units of grams (g).

According to various example embodiments, the electronic device may confirm purchase request quantity information by receiving an input of a user to select a purchase request quantity of an item. A user may select a purchase request quantity on a page 410 for selecting a purchase request quantity of an item through a terminal. The electronic device may confirm the purchase request quantity selected by the user and may provide purchasable quantity information to a predetermined area 420 based on the confirmed purchase request quantity information. Here, the predetermined area 420 may be an area corresponding to the purchase request quantity selected by the user. For example, when the user selects "50 pieces*1 box" on the page 410 in which the user selects the purchase request quantity of the item, the electronic device may provide the purchasable quantity information that the user may purchase to the predetermined area 420 on the right of "50 pieces*1 box."

Figure 5A:
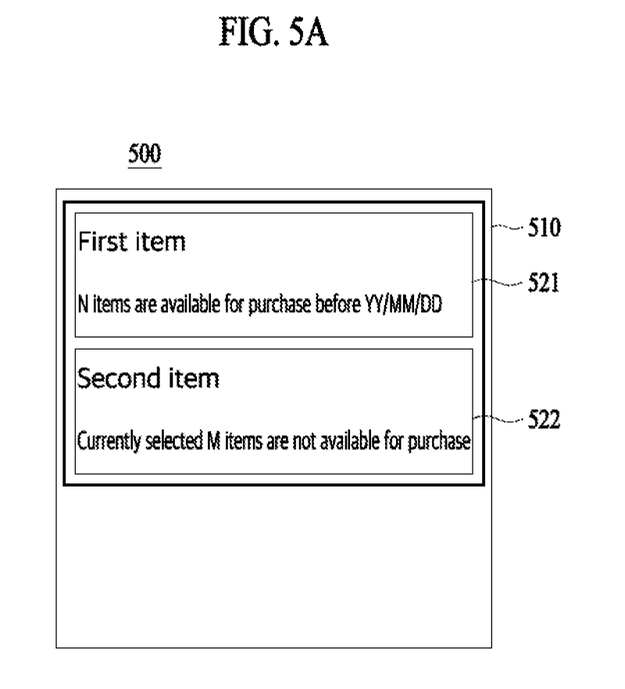
FIGS. 5A and 5B are exemplary diagrams of purchasable quantity information related to an item according to various example embodiments of the present disclosure.
Figure 5B:
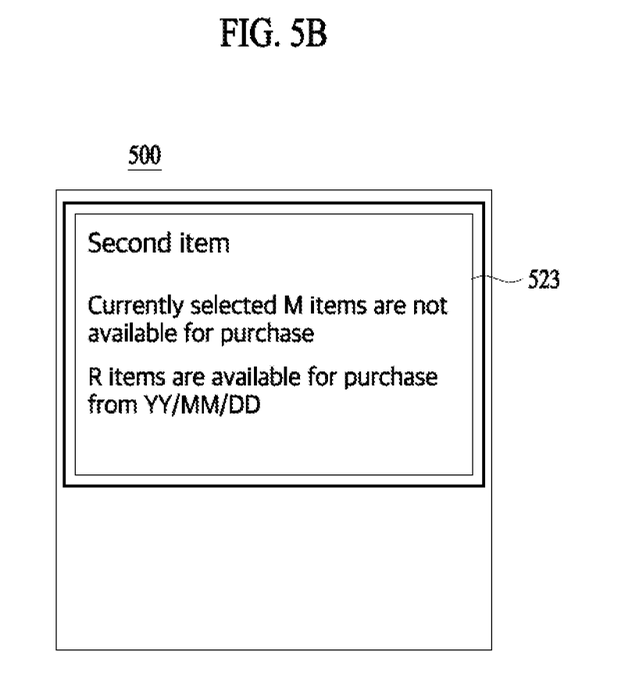

FIGS. 5A and 5B are exemplary diagrams of purchasable quantity information related to an item according to various example embodiments of the present disclosure.

Referring to FIGS. 5A and 5B, the electronic device may provide purchasable quantity information related to an item to a user based on the limited quantity information, the information of the user, and the purchase request quantity information. The purchasable quantity information related to the item may include information on a time when an item included in a specific category may be purchased and quantity information on the item.

Pages provided in FIGS. 5A and 5B may include a page 500 providing purchasable quantity information. The purchasable quantity information may be provided in some area 330 of FIG. 3 or the predetermined area 420 of FIG. 4, but the page 500 providing the purchasable quantity information in FIGS. 5A and 5B may provide information on a time when a plurality of items may be purchased and quantity information on or regarding the items together. A first item and a second item, which are examples described in FIGS. 5A and 5B, are assumed to be items included in a specific category.

According to various example embodiments, a user may purchase a plurality of items included in a specific category through a terminal. For example, a user may purchase the first item and the second item that are the items included in the specific category together. The electronic device may confirm whether an item selected by a user is included in a specific category, confirm purchase request quantity information on the selected item, and provide purchasable quantity information of the user according to individual items.

According to an example embodiment, the electronic device may compare the sum of the user's purchase request quantity information and first quantity information on the item included in the specific category with limited quantity information. Here, the first quantity information may include information on a purchased quantity corresponding to the time when the item included in the specific category has been purchased through an account of a user. When the sum of the purchase request quantity information and the first quantity information is greater than the limited quantity information, the electronic device may provide the purchasable quantity information related to the item including the second quantity information. Here, the second quantity information may include a difference between the limited quantity information and the purchase request quantity information. For example, when a user intends to purchase a mask, the electronic device may confirm purchase request quantity information of 10 pieces and first quantity information of 100 pieces and confirm that limited quantity information on a mask is 100 pieces, thereby comparing the sum (for example, 110 pieces) of the purchase request quantity information and the first quantity information with the limited quantity information (for example, 100 pieces). The electronic device may confirm that the sum of the purchase request quantity information and the first quantity information is greater than the limited quantity information to provide a user with second quantity information of zero pieces corresponding to the difference between the limited quantity information and the purchase request quantity information as the purchasable quantity information.

Referring to FIG. 5A, the electronic device may provide purchasable quantity information 521 on the first item. As an example, the electronic device may confirm the sum of the user's purchase request quantity information and first quantity information to provide purchasable quantity information 521 on N first items as the second quantity information. The electronic device may provide the purchasable quantity information 521 on the first item on the basis of information of user, and in FIG. 5A, the electronic device may provide information on "year/month/day" together. The electronic device may confirm information on a time when an item has been purchased through an account of a user and quantity information on or regarding the item to jointly provide the information on "year/month/day" information as illustrated in FIG. 5A.

The electronic device may provide inability-to-purchase quantity information 522 on the second item. As an example, the electronic device may confirm the sum of the user's purchase request quantity information and first quantity information to provide the inability-to-purchase quantity information 522 on M first items as the second quantity information. Here, when a user intends to purchase an item included in a specific category in excess of a purchase limit quantity, the electronic device may provide the inability-to-purchase quantity information, which is exemplarily described here, to the user For example, when a user intends to purchase a second item with a purchase limit quantity of 100 pieces and when the purchase request quantity information is 20 pieces and the first quantity information is 90 pieces, the electronic device may provide information that 20 pieces corresponding to the purchase request quantity information are not available for purchase, or provide information that 10 pieces are not available for purchase excluding a range which does not exceed the purchase limit quantity.

According to various example embodiments, the electronic device may provide purchasable quantity information 523 on the second item. Referring to FIGS. 5A and 5B, the electronic device may provide the purchasable quantity information on the second item including the time of "year/month/day" as well as the inability-to-purchase information on the M second items selected by the user in FIG. 5A. For example, when a user intends to purchase a second item with a purchase limit quantity of 100 pieces and when the purchase request quantity information is 20 pieces and the first quantity information is 90 pieces, the electronic device may provide information that 20 pieces corresponding to the purchase request quantity information are not available for purchase or information that 10 pieces are available for purchase from "year/month/day." Here, the information that a user may purchase 10 second items may be acquired from the information of the user confirmed by the electronic device. For example, it may be assumed that a user has no history of purchasing the second item before Feb. 1, 2021, and a user has a history of purchasing 90 second items on Feb. 1, 2021. The electronic device may confirm information on a time when an item has been purchased through an account of a user, with a start point being Feb. 1, 2021 which is an initial time when a user purchases a second item as an item included in a specific category and an end point being Feb. 28, 2021 included in a range (for example, one month) of a preset period. When a user intends to purchase 20 second items on Feb. 10, 2021, the electronic device may provide information that the first quantity information is confirmed as 90 pieces and 20 pieces are not available for purchase and provide information that 10 pieces are available for purchase until Feb. 28, 2021. As another example, the electronic device may provide the information that the first quantity information is confirmed as 90 and the information that 10 pieces are not available for purchase and provide information that 100 pieces are available for purchase from "Mar. 1, 2021." As described above, the purchasable quantity information 523 on the second item may be provided in various manners and is not limited to the manners illustrated.

Referring to FIGS. 5A and 5B, the electronic device may provide recommended quantity information based on the purchase request quantity information of the user while providing the inability-to-purchase quantity information 522 and the purchasable quantity information 523 on the second item. For example, the electronic device may confirm the quantity information on the second item currently available for purchase by the user as 11 pieces. When the purchase request quantity information on the second item by the user is confirmed as 20 pieces, the electronic device may provide 10 or 11 pieces as the recommended quantity information on the second item to the user. Here, the case where the electronic device provides 10 pieces as the recommended quantity information may include a case where an item included in a specific category is being sold in units of 10 bundles or may include a case where a quantity unit of an item being sold by a seller is a bundle.

Figure 6:
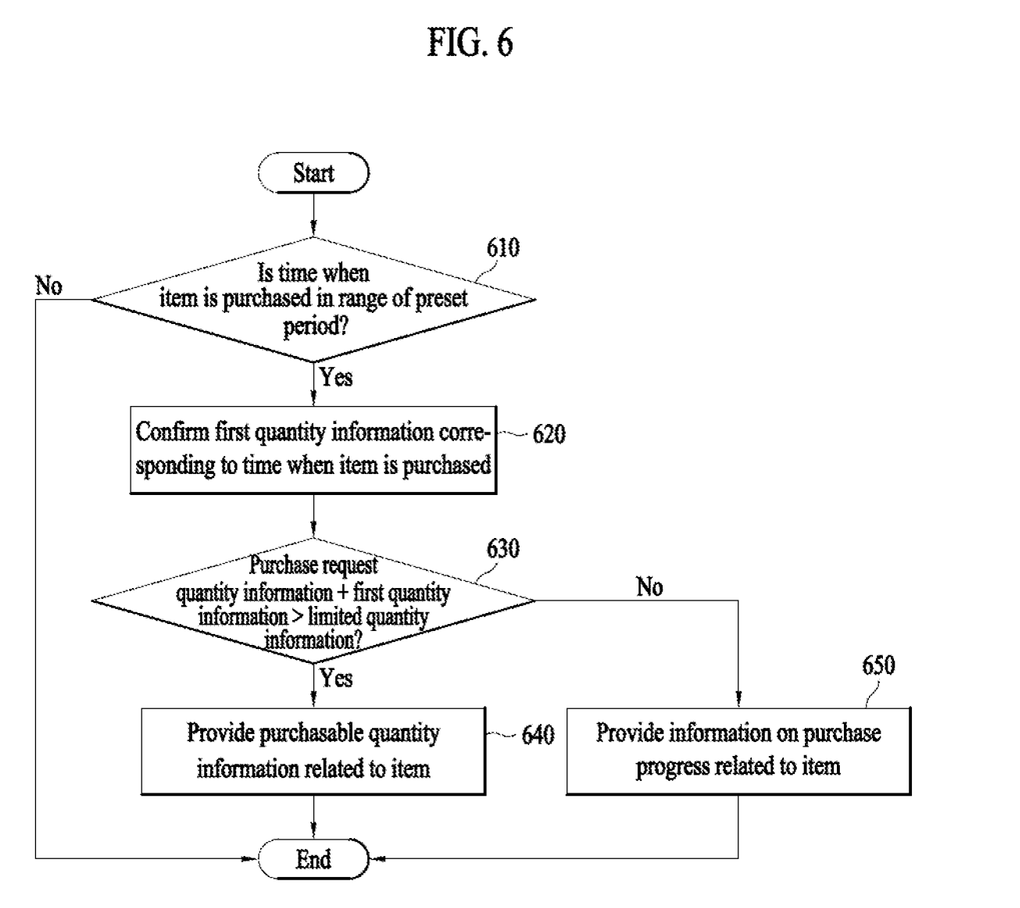
FIG. 6 is a flowchart of providing the purchasable quantity information related to the item according to various example embodiments of the present disclosure.

FIG. 6 is a flowchart of providing purchasable quantity information related to an item according to various example embodiments of the present disclosure.

Referring to FIG. 6, the electronic device may provide the purchasable quantity information based on the purchase request quantity information, the first quantity information, and the limited quantity information on the item included in the specific category.

In operation 610, the electronic device may confirm whether the time when the item has been purchased falls within a preset period. For example, it may be assumed that a user has no history of purchasing an item before Feb. 1, 2021 and a user has a history of purchasing 90 items on Feb. 1, 2021. The electronic device may confirm information on a time when an item has been purchased through an account of a user, with a start point being Feb. 1, 2021 which is a first time when a user purchases an item as an item included in a specific category and an end point being Feb. 28, 2021 included in a range (for example, one month) of a preset period. The electronic device may confirm whether the time when the user has purchased the item is within a range of a preset period and may confirm the purchase quantity information on the item within the range of the start point and the end point. When a current purchase time when the user intends to purchase the selected item is not included in the range of the preset period, the electronic device may confirm that the current purchase time when the user intends to purchase the selected item may correspond to an initial time of purchasing an item and end the process of FIG. 6. The electronic device may proceed to operation 620 when the current purchase time when the user purchases the selected item is included in the range of the preset period. It may be determined whether the current purchase time when the user intends to purchase the selected item is included in the preset period range by confirming whether there is a purchase history of purchasing the selected item before the current purchase time or whether there is a purchase history within the range of the preset period.

In operation 620, the electronic device may confirm the corresponding first quantity information at the time when the item has been purchased. The first quantity information may include the purchase quantity information corresponding to the time when the item included in the specific category has been purchased through the account of the user. For example, the electronic device may confirm the first quantity information that the user has purchased 90 items on Feb. 1, 2021.

In operation 630, the electronic device may compare the sum of the purchase request quantity information and the first quantity information with the limited quantity information. Assuming that a user has a history of purchasing 90 items on Feb. 1, 2021 for an item having 100 pieces as a purchase limit quantity, the electronic device may confirm the range of the preset period of one month from the purchase time of the item as Feb. 1, 2021. Here, the range of the preset period corresponds to a range from Feb. 1, 2021 to Feb. 28, 2021, which is one month. As an example, when a user intends to purchase 20 items on Feb. 10, 2021, the electronic device may confirm that the sum of the purchase request quantity and the first quantity information is greater than the limited quantity information. The electronic device may proceed to operation 640 when the sum of the purchase request quantity information and the first quantity information is greater than the limited quantity information and may proceed to operation 650 when the sum of the purchase request quantity information and the first quantity information is smaller than the limited quantity information.

In operation S640, the electronic device may provide purchasable quantity information related to an item to a user. For example, when a user intends to purchase 20 items on Feb. 10, 2021, the electronic device may provide information that the first quantity information is confirmed as 90 pieces and 20 pieces are not available for purchase and provide information that 10 pieces are available for purchase until Feb. 28, 2021. As another example, the electronic device may provide information that the first quantity information is confirmed as 90 pieces and 10 pieces are not available for purchase and provide information that 100 pieces are available for purchase from "Mar. 1, 2021."

In operation 650, the electronic device may provide information on a purchase progress related to an item. When the sum of the purchase request quantity information and the first quantity information is less than or equal to the limited quantity information, the electronic device may provide a page including the information on the purchase progress related to the item to the user.

Figure 7:
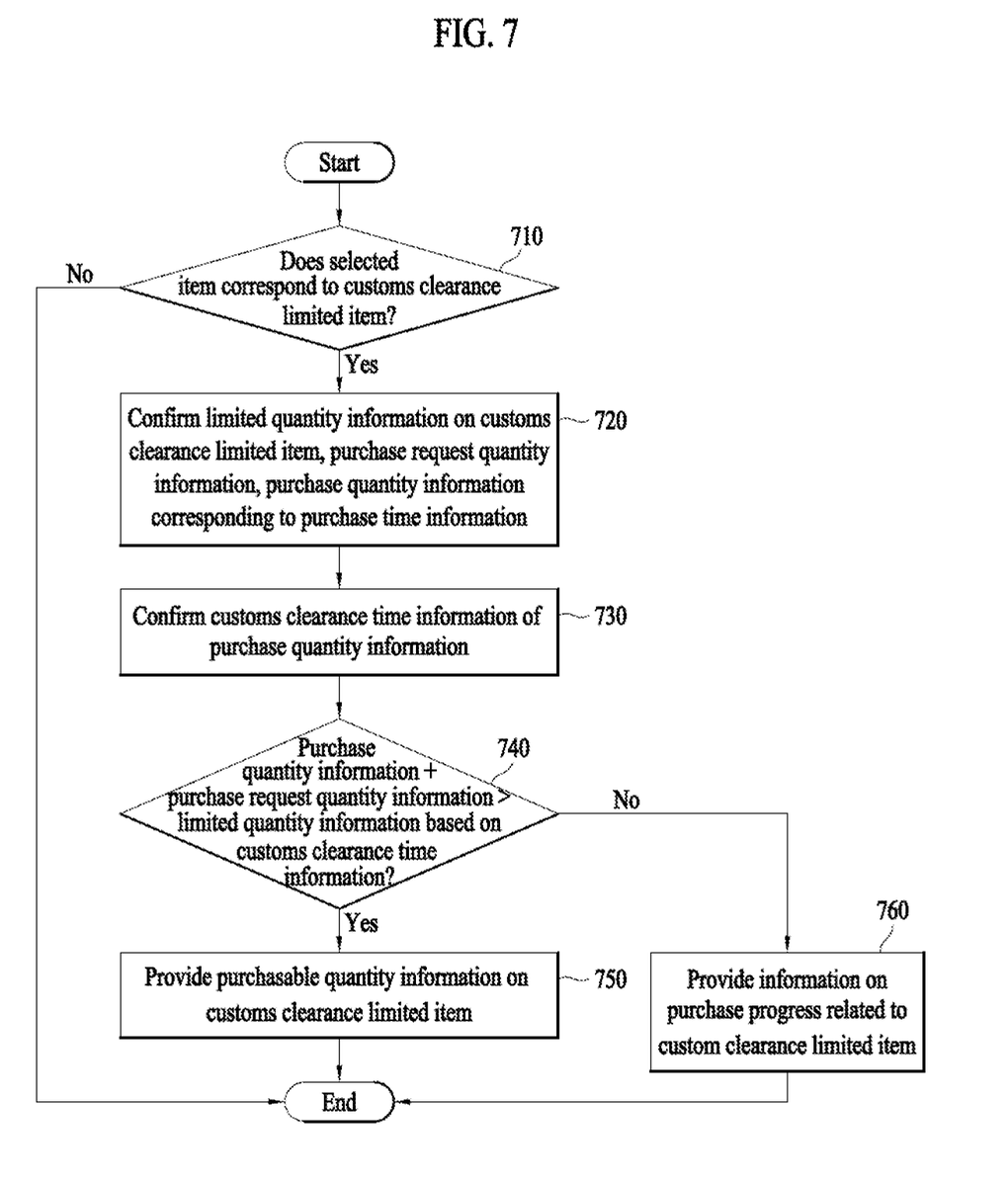
FIG. 7 is a schematic flowchart of providing purchasable quantity information related to a customs clearance limited item according to various example embodiments of the present disclosure.

FIG. 7 is a schematic flowchart of providing purchasable quantity information related to a customs clearance limited item according to various example embodiments of the present disclosure.

Referring to FIG. 7, the electronic device may provide purchasable quantity information by confirming whether an item is a customs clearance limited item even when the item is not included in a specific category. Here, the customs clearance limited item may include an item whose quantity is limited at the time of customs clearance when purchasing an item from abroad and may include a nutritional supplement functional food.

In operation 710, the electronic device may confirm whether the selected item corresponds to the customs clearance limited item. The electronic device may end the process of FIG. 7 when the selected item does not correspond to the customs clearance limited item and may proceed to operation 720 when the selected item corresponds to the customs clearance limited item.

In operation 720, the electronic device may confirm the limited quantity information and the purchase request quantity information on the customs clearance limited item, and the purchase quantity information corresponding to the purchase time information. When the customs clearance limited item is a nutritional functional food, the electronic device may confirm the limited quantity information on the customs clearance limited item as six pieces. The electronic device may confirm the purchase request quantity information on the customs clearance limited item of the user. The electronic device may confirm the purchase time information on the customs clearance limited item and the purchase quantity information on the customs clearance limited item corresponding to the purchase time information through the previous purchase history of the user. For example, the electronic device may confirm the first quantity information that the user has purchased four customs clearance limited items on Feb. 1, 2021.

According to various example embodiments, it may be assumed that a user intends to select and purchase a first health functional food and a second health functional food in relation to a health functional food among the customs clearance limited items. In the case of Korea, the number of health functional foods is limited to six per person at the time of the customs clearance once. As an example, when a user purchases a total of six health functional foods while simultaneously purchasing the first health functional food and the second health functional food, the electronic device may confirm that the customs clearance time of the customs clearance limited items is the same. Assuming that the customs clearance limited items purchased at the same time will be given the same delivery number and the same customs clearance number, the electronic device may confirm that the customs clearance time is the same. As another example, when a user purchases three first health functional foods on Feb. 1, 2021 and four second health functional foods on Feb. 3, 2021, the electronic device may confirm that the customs clearance time of the customs clearance limited items may be the same or different. The reason why the electronic device confirms that the customs clearance time of the customs clearance limited items is the same is because there are cases in which customs clearance for items purchased by the same person may be made on the same day even when the customs clearance limited items are purchased on different dates. The reason why the electronic device confirms that the customs clearance time of the customs clearance limited items is different is because there are cases in which customs clearance for items purchased by the same person on different dates may be made on different days. As described above, when the purchase date of the customs clearance limited item of the user is different but adjacent, the electronic device may confirm the customs clearance time for the purchased item according to a preset time.

In operation 730, the electronic device may confirm the customs clearance time information of the purchase quantity information on the customs clearance limited item. For example, when a user purchases four customs clearance limited items on Feb. 1, 2021, the electronic device may confirm that the customs clearance time information on four customs clearance limited items is Feb. 5, 2021. The electronic device may confirm the customs clearance time information based on a preset time. For example, when the electronic device confirms that a user purchases three first health functional foods on Feb. 1, 2021, the preset time is set to 3 days, and thus, it may be confirmed that the customs clearance time of the three first health functional foods, which are the customs clearance limited items, is Feb. 4, 2021. As described above, confirming the customs clearance time information of the purchase quantity information on the customs clearance limited item by the electronic device may include confirming for one individual user. Here, the reason for setting the preset time to 3 days is that the customs clearance time may be the same even when the purchase time is different. The electronic device may predict the customs clearance time of the customs clearance limited item, confirm the customs clearance time, and provide the purchasable quantity information of the customs clearance limited item to the user.

In operation 740, the electronic device may confirm whether the sum of the user's purchase quantity information and purchase request quantity information on the customs clearance limited item is greater than the limited quantity information based on the customs clearance time information. For example, the purchase quantity information may correspond to the purchase quantity information corresponding to the purchase time information confirmed in operation 720. The electronic device may proceed to operation 750 when the sum of the user's purchase quantity information and purchase request quantity information on the customs clearance limited item is greater than the limited quantity information. The electronic device may proceed to operation 760 when the sum of the purchase quantity information and the purchase request quantity information on the customs clearance limited item is smaller than the limited quantity information.

In operation 750, the electronic device may provide the purchasable quantity information on or regarding the customs clearance limited item. For example, when the electronic device confirms that a user purchases three first health functional foods on Feb. 1, 2021, the preset time is set to 3 days, and thus, it may be confirmed that the customs clearance time of the three first health functional foods, which are the customs clearance limited items, is Feb. 4, 2021. The electronic device may provide the user with three pieces of purchasable quantity information on the customs clearance limited item until Feb. 4, 2021. As another example, the electronic device may provide six pieces of purchasable quantity information on the customs clearance limited item when the user intends to purchase the customs clearance limited item after Feb. 5, 2021.

In operation 760, the electronic device may provide the information on the purchase progress related to the customs clearance limited item. The electronic device may provide the information on the purchase progress related to the customs clearance limited item to the user through the comparison information in operation 740.

According to various example embodiments, the electronic device may confirm information on an item with a surge in a sales quantity even when an item selected by a user is not included in a specific category. For example, the electronic device may monitor whether there is an item whose sales quantity rapidly increases in real time among all items on sale. The electronic device may provide information related to inability to purchase items not included in a specific category when information related to the confirmed sales quantity exceeds a preset quantity range. For example, when a specific user or a number of unspecified users purchase items that are not included in a specific category in excess of a preset quantity range, the electronic device may determine the items to be hoarded and provide the information related to purchase.

According to various example embodiments, the electronic device may confirm information related to a sales quantity of items not included in a specific category in a preset time range. For example, the electronic device may provide a user with the information related to inability to purchase when a sales quantity of items (for example, orange) not included in a specific category in a preset time range (for example, 30 minutes) exceeds a preset quantity range (for example, 1000 pieces).

According to various example embodiments of the present disclosure, an information processing method of an electronic device may include acquiring information on a selection of a user for one or more items, confirming whether at least some of the one or more selected items are included in a specific category, confirming limited quantity information corresponding to the specific category based on the confirmation result, confirming purchase request quantity information based on the information on the selection of the user for the one or more items, confirming the information of the user, and providing purchasable quantity information related to the one or more items to the user based on the limited quantity information and the information of the user.

In the information processing method of an electronic device according to various example embodiments of the present disclosure, the providing of the purchasable quantity information may include providing the purchasable quantity information related to the one or more items to the user further based on the purchase request quantity information, and the purchase request quantity information may include individual quantity information on individual items among the one or more items.

In the information processing method of an electronic device according to various example embodiments of the present disclosure, the confirming of the information of the user may include account information of the user, information on a time when the one or more items have been purchased through an account of the user, and information on a purchase quantity of the one or more items through the account of the user.

In the information processing method of an electronic device according to various example embodiments of the present disclosure, the confirming of the information of the user may include confirming the information of the user including first quantity information which is information on a purchase quantity corresponding to a time when the one or more items have been purchased through an account of the user when the information on the time when the one or more items have been purchased through the account of the user is included in a preset period.

In the information processing method of an electronic device according to various example embodiments of the present disclosure, the providing of the purchasable quantity information related to the one or more items may include providing the purchasable quantity information related to the one or more items including second quantity information when the sum of the purchase request quantity information and the first quantity information is greater than the limited quantity information, and the second quantity information may be a difference between the limited quantity information and the purchase request quantity information.

The information processing method of an electronic device according to various example embodiments of the present disclosure may further include providing a page including information on a purchase progress related to the one or more items to the user when the sum of the purchase request quantity information and the first quantity information is less than or equal to the limited quantity information.

In the information processing method of an electronic device according to various example embodiments of the present disclosure, the quantity information of the one or more items included in the specific category may be selected corresponding to a quantity unit of an individual item.

In the information processing method of an electronic device according to various example embodiments of the present disclosure, recommended quantity information on the one or more items may be provided based on the purchase request quantity information.

The information processing method of an electronic device according to various example embodiments of the present disclosure may further include providing the information on the time when the one or more items included in the specific category is purchased and the purchasable quantity information when the sum of the purchase request quantity information and the first quantity information is greater than the limited quantity information.

In the information processing method of an electronic device according to various example embodiments of the present disclosure, the information on the time when the one or more items included in the specific category is purchased may be determined based on the preset period and the information on the time when the one or more items have been purchased through the account of the user, and the purchasable quantity information on or regarding the one or more items included in the specific category may be determined based on the first quantity information.

The information processing method of an electronic device according to various example embodiments of the present disclosure may further include confirming whether the one or more selected items corresponds to a customs clearance limited item, confirming limited quantity information on the customs clearance limited item when the one or more selected item corresponds to the customs clearance limited item, confirming purchase request quantity information on the customs clearance limited item of the user, confirming purchase time information of the user on the customs clearance limited item and purchase quantity information on the customs clearance limited item corresponding to the purchase time information, and providing the purchasable quantity information on the customs clearance limited item based on the limited quantity information and the purchase request quantity information on the customs clearance limited item, and the purchase quantity information on the customs clearance limited item corresponding to the purchase time information, in which the purchasable quantity information on the customs clearance limited item may be determined corresponding to customs clearance time information on the purchase quantity information of the customs clearance limited item corresponding to the purchase time information.

The information processing method of an electronic device according to various example embodiments of the present disclosure may further include confirming whether the one or more selected items corresponds to a customs clearance limited item, confirming the customs clearance time of the customs clearance limited item when the one or more selected item corresponds to the customs clearance limited item, and providing the purchasable quantity information on the customs clearance limited item based on the customs clearance time, in which the purchasable quantity information on the customs clearance limited item may be determined corresponding to the customs clearance time.

According to various example embodiments of the present disclosure, an electronic device for performing an information processing method may include a processor, in which the processor may be configured to acquire information on a selection of a user for one or more items, confirm whether at least some of the one or more selected items are included in a specific category, confirm limited quantity information corresponding to the specific category based on the confirmation result, confirm purchase request quantity information based on the information on the selection of the user for the one or more items, and provide purchasable quantity information related to the one or more items to the user based on the limited quantity information and the information of the user.

According to various example embodiments of the present disclosure, a non-transitory computer-readable storage medium may include a medium that stores computer-readable instructions to execute a method of processing item sales information, in which when the computer-readable instructions are executed by a processor, the processor may perform acquiring information on a selection of a user for one or more items, confirming whether at least some of the one or more selected items are included in a specific category, confirming limited quantity information corresponding to the specific category based on the confirmation result, confirming purchase request quantity information based on the information on the selection of the user for the one or more items, confirming the information of the user, and providing purchasable quantity information related to the one or more items to the user based on the limited quantity information and the information of the user.

Meanwhile, the example embodiment of the present disclosure has been disclosed in the present specification and drawings, and although specific terms are used, this is merely used in a general sense to easily describe the technical content of the present disclosure and to aid understanding of the present disclosure but is not intended to limit the scope of the present disclosure. It is obvious to those of ordinary skill in the art to which the present disclosure pertains that other modifications based on the technical idea of the present disclosure can be implemented in addition to the example embodiments disclosed herein.

The electronic device or terminal according to the above-described example embodiments may include a processor, a memory that stores and executes program data, a permanent storage such as a disk drive, a communication port for communication with an external apparatus, a touch panel, a key, a user interface device such as a button, and the like. Methods implemented as software modules or algorithms may be stored on a computer-readable recording medium as computer-readable code or program instructions executable on the processor. Here, examples of the computer-readable recording medium may include magnetic storage media (for example, a read-only memory (ROM), a random-access memory (RAM), a floppy disk, a hard disk, etc.), optical reading media (for example, a compact disk (CD)-ROM or a digital versatile disc (DVD)), and the like. The computer-readable recording medium may be distributed in computer systems connected to each other through a network, and as a result, the computer-readable code may be stored and executed in a distributed scheme. The medium may be readable by a computer, stored in a memory, and executed on a processor.

The present embodiment may be represented by functional block configurations and various processing operations. These functional blocks may be implemented by various numbers of hardware and/or software components that execute specific functions. For example, the embodiment may employ integrated circuit configurations, such as a memory, processing, logic, and a look-up table, capable of executing various functions by control of one or more microprocessors or other control devices. Similar to executing the components in software programming or software elements, the present embodiment can be implemented in programming or scripting languages such as C, C++, Java, Assembly, and Python including various algorithms implemented by a combination of data structures, processes, routines or other programming configurations. Functional aspects may be implemented in algorithms executed on one or more processors. In addition, the present embodiment may employ a conventional technology for electronic environment setting, signal processing, and/or data processing, and the like. Terms such as "mechanism," "element," "means," and "configuration" may be used broadly and are not limited to mechanical and physical configurations. The terms may include the meaning of a series of routines of software in connection with a processor or the like.

The above-described example embodiments are merely examples, and other example embodiments may be implemented within the scope of the following claims.

What is claimed is:

1. A method of item sales processing information by an electronic device, the method comprising:

receiving, from a user terminal and via interaction with a first graphical user interface, a first selection for one or more items;

acquiring, based on the first selection, information on the one or more selected items;

determining, by a processor and based on the acquired information on the one or more selected items, whether at least some of the one or more selected items are included in a specific category;

identifying limited quantity information corresponding to the specific category based on a determination result that the at least some of the one or more selected items are included in the specific category;

identifying purchase request quantity information based on the information on the one or more selected items, wherein the information on the one or more selected items comprises information on a first time;

determining, by the processor, whether the information on the first time satisfies a preset time range;

identifying, based on a determination that the information on the first time satisfies the preset time range, information of a user including first quantity information, which comprises information on a purchase quantity corresponding to the first time when the one or more selected items have been purchased through an account of the user;

determining, by the processor, whether a sum of the purchase request quantity information and the first quantity information is greater than the limited quantity information;

determining, by the processor and for the account of the user, based on a determination that the sum of the purchase request quantity information and the first quantity information is greater than the limited quantity information, and for at least some of the one or more selected items included in the specific category, information on purchasable quantity, information on inability-to-purchase quantity information, and information on a second time when the limited quantity according to the limited quantity information of the one or more selected items is available to be purchased, wherein the information on the purchasable quantity is based on the limited quantity information and the first quantity information, and wherein the information on the inability-to-purchase quantity is based on the purchase request quantity information and the information on the purchasable quantity, and wherein the information on the second time is based on the information on the first time and the preset time range;

generating, based on a determination of the information on the purchasable quantity, the information on the inability-to-purchase quantity, and the information on the second time, a second graphical user interface, for display on the user terminal, identifying the information on the purchasable quantity, the information on the inability-to-purchase quantity, and the information on the second time;

sending, to the user terminal, the second graphical user interface; and receiving, from interaction by the user with the second graphical user interface, a second selection comprising a revised quantity of the one or more selected items.

2. The method of claim 1, wherein:
the purchase request quantity information comprises individual quantity information regarding individual items among the one or more selected items.

3. The method of claim 1, further comprising providing the second graphical user interface including information on a purchase progress related to the one or more selected items to the user when the sum of the purchase request quantity information and the first quantity information is less than or equal to the limited quantity information.

4. The method of claim 1, wherein the purchase request quantity information of the at least some of the one or more selected items included in the specific category is selected based on a quantity unit of an individual item.

5. The method of claim 1, wherein recommended quantity information regarding the one or more selected items is provided based on the purchase request quantity information.

6. The method of claim 1 further comprising:
providing the second graphical user interface identifying information on a time when the one or more selected items included in the specific category is available to purchased when the sum of the purchase request quantity information and the first quantity information is greater than the limited quantity information.

7. The method of claim 6, wherein:
the information on the time when the one or more selected items included in the specific category is available to purchased is determined based on the preset time range and the information on the time when the one or more selected items have been purchased through the account of the user.

8. The method of claim 1, further comprising:
identifying information related to a sales quantity of one or more selected items not included in the specific category; and
providing the second graphical user interface identifying the inability-to-purchase quantity information regarding the one or more selected items not included in the specific category when the identifying information related to the sales quantity exceeds a preset quantity range,
wherein the identifying information related to the sales quantity of the one or more selected items not included in the specific category corresponds to a preset time range.

9. The method of claim 1, further comprising:
determining whether the one or more selected items corresponds to a customs clearance limited item;
identifying limited quantity information regarding the customs clearance limited item when the one or more selected items correspond to the customs clearance limited item;

identifying purchase request quantity information regarding the customs clearance limited item of the user;
identifying purchase time information of the user on the customs clearance limited item and purchase quantity information regarding the customs clearance limited item corresponding to the purchase time information; and
providing the second graphical user interface identifying purchasable quantity information regarding the customs clearance limited item based on the limited quantity information and the purchase request quantity information regarding the customs clearance limited item, and the purchase quantity information regarding the customs clearance limited item corresponding to the purchase time information,
wherein the purchasable quantity information regarding the customs clearance limited item is determined based on customs clearance time information regarding the purchase quantity information of the customs clearance limited item corresponding to the purchase time information.

10. The method of claim 7, wherein:
the purchase request quantity information comprises individual quantity information regarding individual items among the one or more selected items.

11. The method of claim 10, further providing the second graphical user interface including information on a purchase progress related to the one or more selected items to the user when the sum of the purchase request quantity information and the first quantity information is less than or equal to the limited quantity information.

12. The method of claim 11, wherein the purchase request quantity information of the at least some of the one or more selected items included in the specific category is selected based on a quantity unit of an individual item.

13. The method of claim 12, wherein recommended quantity information regarding the one or more selected items is provided based on the purchase request quantity information.

14. The method of claim 13, further comprising:
identifying information related to a sales quantity of one or more selected items not included in the specific category; and
providing the second graphical user interface identifying the inability-to-purchase quantity information regarding the one or more selected items not included in the specific category when the information related to the sales quantity exceeds a preset quantity range,
wherein the identifying information related to the sales quantity of the one or more selected items not included in the specific category corresponds to a preset time range.

15. The method of claim 14, further comprising:
identifying limited quantity information regarding a customs clearance limited item when the one or more selected items correspond to the customs clearance limited item;
identifying purchase request quantity information regarding the customs clearance limited item of the user;
identifying purchase time information of the user on the customs clearance limited item and purchase quantity information regarding the customs clearance limited item corresponding to the purchase time information; and
providing the second graphical user interface identifying purchasable quantity information regarding the customs clearance limited item based on the limited quantity information and the purchase request quantity information regarding the customs clearance limited item, and the purchase quantity information regarding the customs clearance limited item corresponding to the purchase time information, wherein the purchasable quantity information regarding the customs clearance limited item is determined based on customs clearance time information regarding the purchase quantity information of the customs clearance limited item corresponding to the purchase time information.

16. An electronic device for performing an item sales information processing method, the electronic device comprising:
   a transceiver;
   a storage in which at least one program is stored; and
   a processor configured to execute the at least one program to:
      receive, from a user terminal and via interaction with a first graphical user interface, a first selection for one or more items;
      acquire, based on the first selection, information on the one or more selected items;
      determine, by the processor and based on the acquired information on the one or more selected items, whether at least some of the one or more selected items are included in a specific category;
      identify limited quantity information corresponding to the specific category based on a determination result that the at least some of the one or more selected items are included in the specific category;
      identify purchase request quantity information based on the information on the one or more selected items, wherein the information on the one or more selected items comprises information on a first time;
      determine, by the processor, whether the information on the first time satisfies a preset time range;
      identify, based on a determination that the information on the first time satisfies the preset time range, information of a user including first quantity information, which comprises information on a purchase quantity corresponding to the first time when the one or more selected items have been purchased through an account of the user;
      determine, by the processor, whether a sum of the purchase request quantity information and the first quantity information is greater than the limited quantity information;
      determine, by the processor and for the account of the user, based on a determination that the sum of the purchase request quantity information and the first quantity information is greater than the limited quantity information, and for at least some of the one or more selected items included in the specific category, information on purchasable quantity, information on inability-to-purchase quantity, and information on a second time when a limited quantity according to the limited quantity information of the one or more selected items is available to be purchased, wherein the information on the purchasable quantity is based on the limited quantity information and the first quantity information, wherein the information on the inability-to-purchase quantity information is based on the purchase request quantity information and the information on the purchasable quantity, and wherein the information on the second time is based on the information on the first time and the preset time range;
      generate, based on a determination of the information on the purchasable quantity, the information on the inability-to-purchase quantity, and the information on the second time, a second graphical user interface, for display on the user terminal, identifying the information on the purchasable quantity, the information on the inability-to-purchase quantity, and the information on the second time;
      send, to the user terminal, the second graphical user interface; and
      receive, from interaction by the user with the second graphical user interface, a second selection comprising a revised quantity of the one or more selected items.

17. A non-transitory computer-readable storage medium comprising a medium that stores computer-readable instructions,
   receiving, from a user terminal and via interaction with a first graphical user interface, a first selection for one or more items;
   acquiring, based on the first selection, information on the one or more selected items;
   determining, by a processor and based on the acquired information on the one or more selected items, whether at least some of the one or more selected items are included in a specific category;
   identifying limited quantity information corresponding to the specific category based on a determination result that the at least some of the one or more selected items are included in the specific category;
   identifying purchase request quantity information based on the information on the one or more selected items, wherein the information on the one or more selected items comprises information on a first time;
   determining, by the processor, whether the information on the first time satisfies a preset time range;
   identifying, based on a determination that the information on the first time satisfies the preset time range, information of a user including first quantity information, which comprises information on a purchase quantity corresponding to the first time when the one or more selected items have been purchased through an account of the user;
   determining, by the processor, whether a sum of the purchase request quantity information and the first quantity information is greater than the limited quantity information;
   determining, by the processor and for the account of the user, based on a determination that the sum of the purchase request quantity information and the first quantity information is greater than the limited quantity information, and for at least some of the one or more selected items included in the specific category, information on purchasable quantity, information on inability-to-purchase quantity information, and information on a second time when limited quantity according to the limited quantity information of the one or more selected items is available to be purchased, wherein the information on the purchasable quantity is based on the limited quantity information and the first quantity information, wherein the information on inability-to-purchase quantity is based on the purchase request quantity information and the information on the purchasable quantity, and wherein the information on the second time is based on the information on the first time and the preset time range;

generating, based on a determination of the information on the purchasable quantity, the information on the inability-to-purchase quantity, and the information on the second time, a second graphical user interface, for display on the user terminal, identifying the information on the purchasable quantity, the information on the inability-to-purchase quantity, and the information on the second time;

sending, to the user terminal, the second graphical user interface; and receiving, from interaction by the user with the second graphical user interface, a second selection comprising a revised quantity of the one or more selected items.

* * * * *